(12) United States Patent
Murata

(10) Patent No.: US 8,089,535 B2
(45) Date of Patent: Jan. 3, 2012

(54) IMAGE PROCESSING DEVICE AND IMAGE PROCESSING METHOD

(75) Inventor: Tsukasa Murata, Yamato (JP)

(73) Assignee: Nikon Corporation, Tokyo (JP)

( * ) Notice: Subject to any disclaimer, the term of this patent is extended or adjusted under 35 U.S.C. 154(b) by 343 days.

(21) Appl. No.: 12/510,775

(22) Filed: Jul. 28, 2009

(65) Prior Publication Data

US 2009/0284624 A1 Nov. 19, 2009

Related U.S. Application Data

(63) Continuation of application No. PCT/JP2008/000146, filed on Feb. 5, 2008.

(30) Foreign Application Priority Data

Feb. 7, 2007 (JP) .................................. 2007-028218

(51) Int. Cl.
*H04N 5/228* (2006.01)
*H04N 5/217* (2011.01)
*G06K 9/00* (2006.01)

(52) U.S. Cl. ....................... 348/241; 348/222.1; 382/167

(58) Field of Classification Search ............... 348/222.1, 348/223.1, 224.1, 225.1, 241, 242; 382/167, 382/293, 298–300
See application file for complete search history.

(56) References Cited

U.S. PATENT DOCUMENTS

| 6,323,934 | B1 | 11/2001 | Enomoto |
| 7,477,290 | B2 * | 1/2009 | Okada ........................ 348/208.6 |
| 7,586,525 | B2 * | 9/2009 | Tamaru et al. ................ 348/241 |
| 2005/0213159 | A1 | 9/2005 | Okada et al. |
| 2006/0188172 | A1 | 8/2006 | Higurashi et al. |
| 2007/0115384 | A1 | 5/2007 | Furukawa |
| 2008/0062409 | A1 * | 3/2008 | Utsugi ........................ 356/124 |

FOREIGN PATENT DOCUMENTS

| JP | 3549413 B2 | 4/2004 |
| JP | 2005-45513 A | 2/2005 |
| JP | 2005-286482 A | 10/2005 |
| JP | 2007-148500 A | 6/2007 |

* cited by examiner

*Primary Examiner* — Daniel M Pasiewicz
(74) *Attorney, Agent, or Firm* — Arent Fox LLP

(57) ABSTRACT

In image processing device, a basic coordinate system corresponding to arrangement directions of the pixel in the two-dimensional image sensor is transformed to a virtual coordinate system corresponding to an arrangement rule of the filters of each of the wavelength components, position calculation processing for image processing containing an aberration correction in the virtual coordinate system corresponding to each of the wavelength components is executed to determine coordinates in the virtual coordinate system, and the coordinates in the virtual coordinate system obtained by the position calculating unit are transformed to coordinates in the basic coordinate system.

7 Claims, 6 Drawing Sheets

IMAGE PROCESSING DEVICE AND IMAGE PROCESSING METHOD

CROSS REFERENCE TO THE RELATED APPLICATIONS

This application is a continuation application of International Application PCT/JP2008/000146, filed Feb. 5, 2008, designating the U.S., and claims the benefit of priority from Japanese Patent Application No. 2007-028218, filed on Feb. 7, 2007, the entire contents of which are incorporated herein by reference.

BACKGROUND

1. Field

The present application relates to an image processing device and an image processing method for processing image data obtained by a two-dimensional image sensor mounted in a digital camera or the like at high speed.

2. Description of the Related Art

A two-dimensional image sensor is mounted in a digital camera, a color image scanner, or the like. Color filters of three colors corresponding to three primary colors of light are arranged in conformity with the arrangement of pixels of the image sensor. Electrical signals reflecting the light intensities of light components passing through these color filters are obtained at the respective pixels.

In a general two-dimensional image sensor, square pixels are arranged two-dimensionally, color filters corresponding to respective R, G, and B components are arranged according to the Bayer array. In this Bayer array, filters for passing therethrough light whose wavelength corresponds to the G component reflecting a brightness component are continuously arranged in an oblique direction. Furthermore, filters for passing light whose wavelengths correspond to the R component and the B component are alternately arranged on lines and columns.

In the image sensor having the color filters arranged in the Bayer array as described above, the pixel data of each pixel represents only the intensity of the component corresponding to the penetration wavelength of the corresponding color filter. Accordingly, the color at the position of each pixel of an image formed on the image sensor is obtained by interpolation with surrounding pixel data for each of the R, G, and B components.

As described above, the interpolation processing of obtaining image data having three color elements of R, G, and B at each of the respective pixels from a Bayer image obtained by the image sensor is called as deBayer processing.

When a Bayer image is obtained by a two-dimensional image sensor, the deBayer processing as described above is first executed to obtain a lineup of R, G, and B components for the respective pixels, and then various image processes such as a distortion correcting process, etc. are executed in many cases (see Patent Document 1: Japanese Patent No. 3549413).

In the image after the deBayer processing described above, all the pixels have the pixel data of the R, G, and B components. Therefore, in order to execute the distortion correcting process and a magnification converting process, it is required to execute a linear interpolation process on the pixel data of each of the R, G, and B components of one frame. This processing quantity is tremendous.

Furthermore, it is possible to execute the distortion correcting process and the magnification converting process on the image based on the Bayer array and then execute the deBayer processing to obtain an image for which distortion is corrected or image data on which the magnification converting process is executed.

However, when the distortion correcting process and also the magnification converting process are executed on the Bayer image itself, the following problems occur. The following problems are caused by the difference in feature between the arrangement of the R and B pixels on which the filters for passing light of the wavelengths corresponding to the R, B components are arranged and the arrangement of the G pixels on which the filters for passing light of the wavelength corresponding to the G component are arranged in the Bayer image.

One of the problems occurs in the case that the high pixel density of the G pixels in the Bayer image cannot be actively used, that is, when interpolation processing for correcting distortion is executed on the pixel arrangement data in which the G component in consideration of a coordinate system which has coordinate axes corresponding to the line and column directions of the pixel arrangement in the two-dimensional image sensor and whose unit corresponds to the arrangement pitch of the R pixels and the B pixels.

According to the above method, the interpolation calculation is performed in a grid formed by G pixels arranged at the same arrangement pitch as the R and B pixels as a unit. At this time, the pixel data of the G pixel located at the center of this grid is not reflected by the interpolation calculation for determining the pixel data at any position in this grid although the G pixel concerned is located at the center of the grid.

Furthermore, it may be considered that a grid formed by four G pixels arranged so as to surround an R pixel or B pixel is used and the interpolation processing of the pixel data of the G component at any position in the grid is executed in the Bayer image. According to this method, the pixel density of the G pixels can be actively used, however, the position calculation processing to correct distortion is complicated.

SUMMARY

It is a proposition of the present embodiment to provide an image processing device and an image processing method that can increase the processing speed of position calculation processing for distortion correction, etc. by utilizing the features of the arrangements of the respective color components in a Bayer image.

An image processing device according to one aspect of the present embodiment has the following construction. In an image processing device for executing processing concerning a pixel value of each pixel corresponding to one of a plurality of wavelength components including a first, a second, and a third wavelength components contained in image data obtained by a two-dimensional image sensor in which each of filters corresponding to one of the plurality of wavelength components including the first, the second, and the third wavelength components is disposed in connection with each pixel according to a rule concerning an arrangement of the filters corresponding to each of the wavelength components, a coordinate transforming unit transforms a basic coordinate system having coordinate axes corresponding to arrangement directions of the pixel in the two-dimensional image sensor to a virtual coordinate system corresponding to an arrangement rule of the filters of each of the wavelength components. A position calculating unit executes position calculation processing for image processing containing an aberration correction in the virtual coordinate system corresponding to each of the wavelength components to determine coordinates in the virtual coordinate system. An inverse transforming unit transforms the coordinates in the virtual coordinate system obtained by the position calculating unit to coordinates in the basic coordinate system.

An image processing device according to another aspect of the present embodiment has the following construction.

In the image processing device which is first described above, a Bayer image obtained by the two-dimensional image sensor in which square pixels are arranged in a two-dimensional arrangement and filters corresponding to the first wavelength component are arranged continuously in an oblique direction is a processing target image, and the coordinate transforming unit has a first transforming unit which performs a transformation from the basic coordinate system to a virtual coordinate system having coordinate axes corresponding to arrangement directions of the filters corresponding to the first wavelength component.

An image processing device according to another aspect of the present embodiment has the following construction.

In the first transforming unit provided to the image processing device which is secondly described above, a coordinate rotating unit performs a rotation of a coordinate system around a predetermined pixel position on the two-dimensional image sensor as a center of the rotation. A first translating unit translates a position of origin of the virtual coordinate system corresponding to the first wavelength component while a size of pixel forming the two-dimensional image sensor is set as a unit. A first scale converting unit performs a scale conversion for setting a length different from the size of pixel forming the two-dimensional image sensor as a unit in the virtual coordinate system corresponding to the first wavelength component.

An image processing device according to another aspect of the present embodiment has the following construction.

In the coordinate transforming unit provided to the image processing device which is secondly described above, a second translating unit translates each position of origin of the virtual coordinate system corresponding to the second wavelength component and the third wavelength component while a size of pixels forming the two-dimensional image sensor is set as a unit. A second scale converting unit performs a scale conversion for setting a length different from the size of pixel forming the two-dimensional image sensor as a unit in the virtual coordinate system corresponding to each of the second wavelength component and the third wavelength component.

An image processing device according to another aspect of the present embodiment has the following construction.

In the image processing device which is thirdly or fourthly described above, a translation amount determining unit independently determines the position of origin of the virtual coordinate system corresponding to each of the wavelength components, the position of origin being translated by the first translating unit or the second translating unit. A unit determining unit independently determines a unit of a scale concerning the virtual coordinate system corresponding to each of the wavelength components, the scale being converted by the first scale converting unit or the second scale converting unit.

An image processing method according to another aspect of the present embodiment has the following construction.

In an image processing method for executing processing concerning a pixel value of each pixel corresponding to one of a plurality of wavelength components including a first, a second, and a third wavelength components contained in image data obtained by a two-dimensional image sensor in which each of filters corresponding to one of the plurality of wavelength components including at least the first, the second, and the third wavelength components is disposed in connection with each pixel according to a rule concerning an arrangement of the filters corresponding to each of the wavelength components, a coordinate transforming step transforms a basic coordinate system having coordinate axes corresponding to arrangement directions of the pixel in the two-dimensional image sensor to a virtual coordinate system corresponding to an arrangement rule of the filters of each of the wavelength components. A position calculating step executes position calculation processing for image processing containing an aberration correction in the virtual coordinate system corresponding to each of the wavelength components to determine coordinates in the virtual coordinate system. An inverse transforming step transforms the coordinates in the virtual coordinate system obtained by the position calculating unit to coordinates in the basic coordinate system.

According to the image processing device and the image processing method of the present embodiment, with respect to image data in which pixel data of R, G, and B components are obtained at different densities like a Bayer image, for example, the processing speed of position calculating processing for distortion correction, etc. can be rapidly increased.

DETAILED DESCRIPTION OF THE EMBODIMENTS

Preferred embodiments according to the present application will be described hereunder with reference to the accompanying drawings.

Embodiment 1

Figure 1:
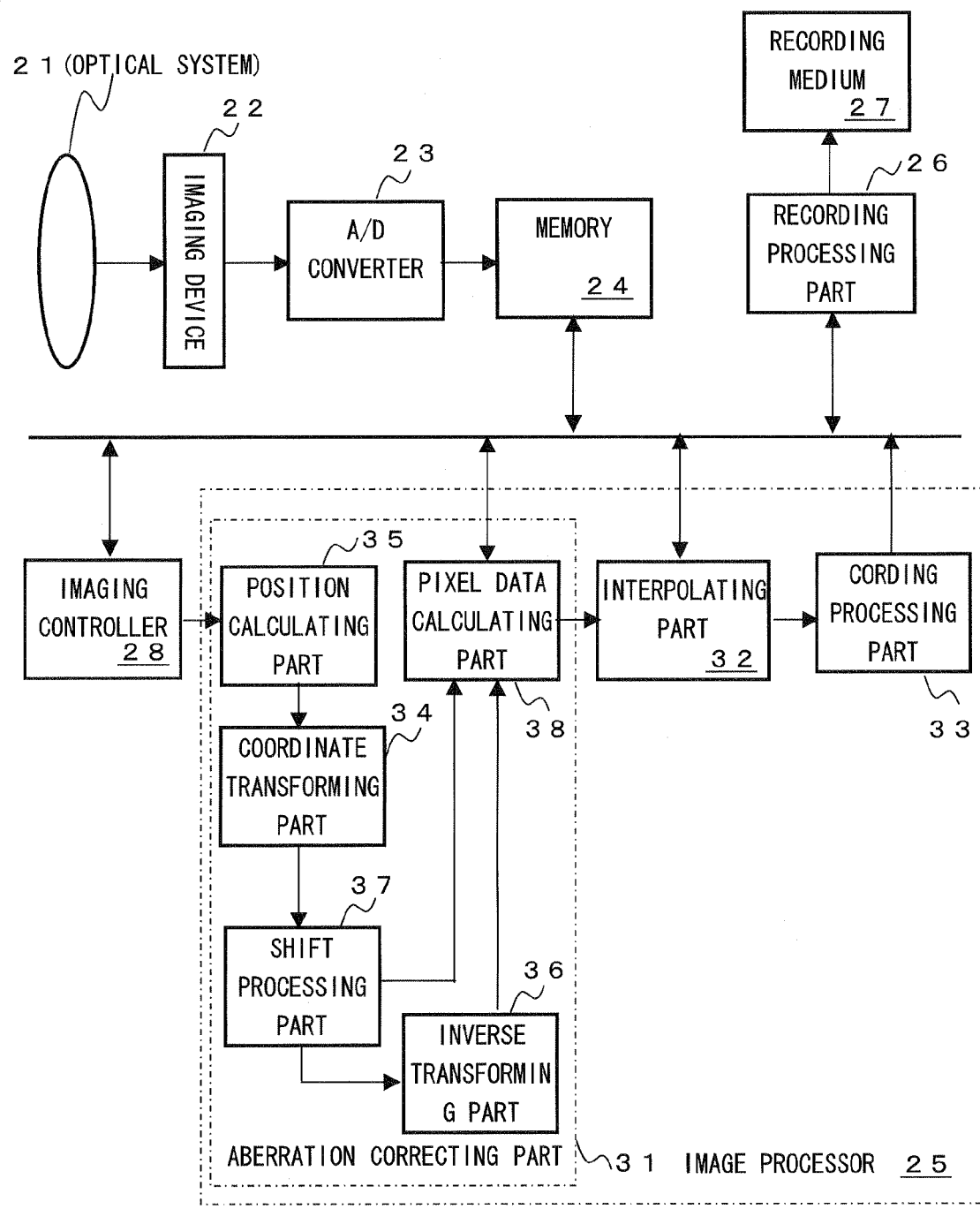
FIG. 1 is a diagram representing an embodiment of an image processing device.

FIG. 1 represents an embodiment of an image processing device according to the present application.

In a digital camera represented in FIG. 1, when an image is picked up, an optical image formed onto an imaging device 22 by an imaging optical system 21 is converted to an electrical signal corresponding to the intensity of the light by the imaging device 22. This electrical signal is converted to digital data by an analog/digital (A/D) converter 23, and then held in a memory 24.

The memory 24 represented in FIG. 1 is connected to an image processor 25, a recording processing part 26 and an imaging controller 28 through a bus. The image processor 25 executes image processing containing coding processing on the digital data stored in the memory 24. Compressed image data obtained as an image processing result are delivered to the recording processing part 26 through the bus, and recorded in a recording medium 27. The operation of the above parts, an auto focus controller and a strobe driving circuit for driving a strobe light source, both of which are not represented, are controlled by the imaging controller 28 according to an instruction which is input through an operation panel (not represented) by a user.

Figure 2:
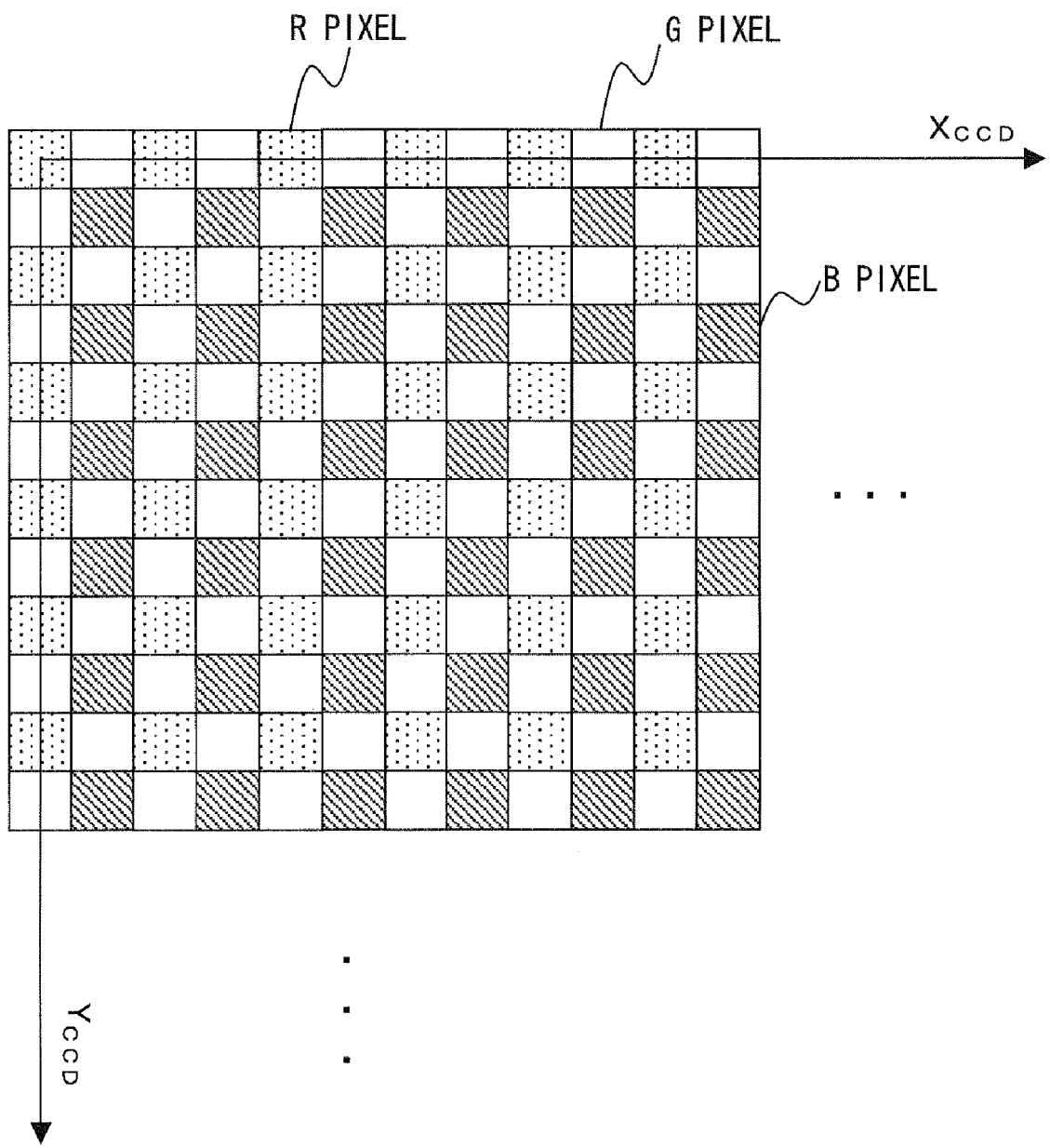
FIG. 2 is a diagram representing a Bayer array.

As the imaging device 22 represented in FIG. 1 is provided with a two-dimensional CCD image sensor in which color filters are arranged according to a Bayer array as represented in FIG. 2. In this case, Bayer image data are obtained by the analog/digital converter 23, and subjected to the processing of the image processor 25 through the memory 24. In FIG. 2, the arrangements of the respective color filters corresponding to the R, G, and B components are illustrated with different types of hatching.

In this image processor 25, prior to deBayer processing of an interpolating part 32, an aberration correcting part 31 executes the processing of correcting distortion and a magnification converting process following the distortion correcting processing. Thereafter, the interpolating part 32 executes the processing of generating image data containing a lineup of R, G, and B components for the respective pixels constituting the two-dimensional image sensor from the Bayer image. Furthermore, the image data obtained by the interpolating part 32 are compressed and encoded by a coding processing part 33, and then delivered to the recording processing part 26.

For example when distortion is corrected by the aberration correcting part 31 represented in FIG. 1, a coordinate representing a position needed for the distortion correction is determined at a position calculating part 35.

At this time, the position calculating part 35 calculates the coordinate value for a coordinate $(x_0, y_0)$ on a distortion-corrected image by using that on the arrangement of pixels in the two-dimensional CCD image sensor in the following formula (1). The formula (1) represents the relationship between the coordinate value $(x_{CCD}, y_{CCD})$ in a coordinate system corresponding to the pixel arrangement in the two-dimensional CCD image sensor and the coordinate $(x_o, y_o)$ of the distortion-corrected image. In FIG. 2, the coordinate system corresponding to the pixel arrangement is represented a coordinate axes $x_{CCD}$ and $y_{CCD}$. The position calculating part 35 calculates the coordinate $(x_{CCD}, y_{CCD})$ satisfying the formula (1) represented by using the coordinate value $(x_c, y_c)$ representing the center Sc of the two-dimensional image sensor, the distortion amount $D(r)$ at a normalized image point distance of r and a magnification converting rate $D_\alpha$ for trimming the distortion-corrected image.

$$x_{CCD} = \frac{100 + D(r)}{100 + D_\alpha}(x_o - x_c) + x_c \quad (1)$$

$$y_{CCD} = \frac{100 + D(r)}{100 + D_\alpha}(y_o - y_c) + y_c$$

A method for increasing the processing speed of determining the pixel data at the position represented by the coordinate $(x_{CCD}, y_{CCD})$ through the interpolation processing by using coordinate transformation will be described.

In the aberration correcting part 31 represented in FIG. 1, with respect to the calculation result of the position calculating part 35, the coordinate transforming part 34 executes the processing of transforming the coordinate system representing the respective positions of the R, G, and B pixels constituting the Bayer image according to the pixel arrangement in the two-dimensional CCD image sensor described above to the coordinate system suited to the features of the respective arrangements.

Figure 3:
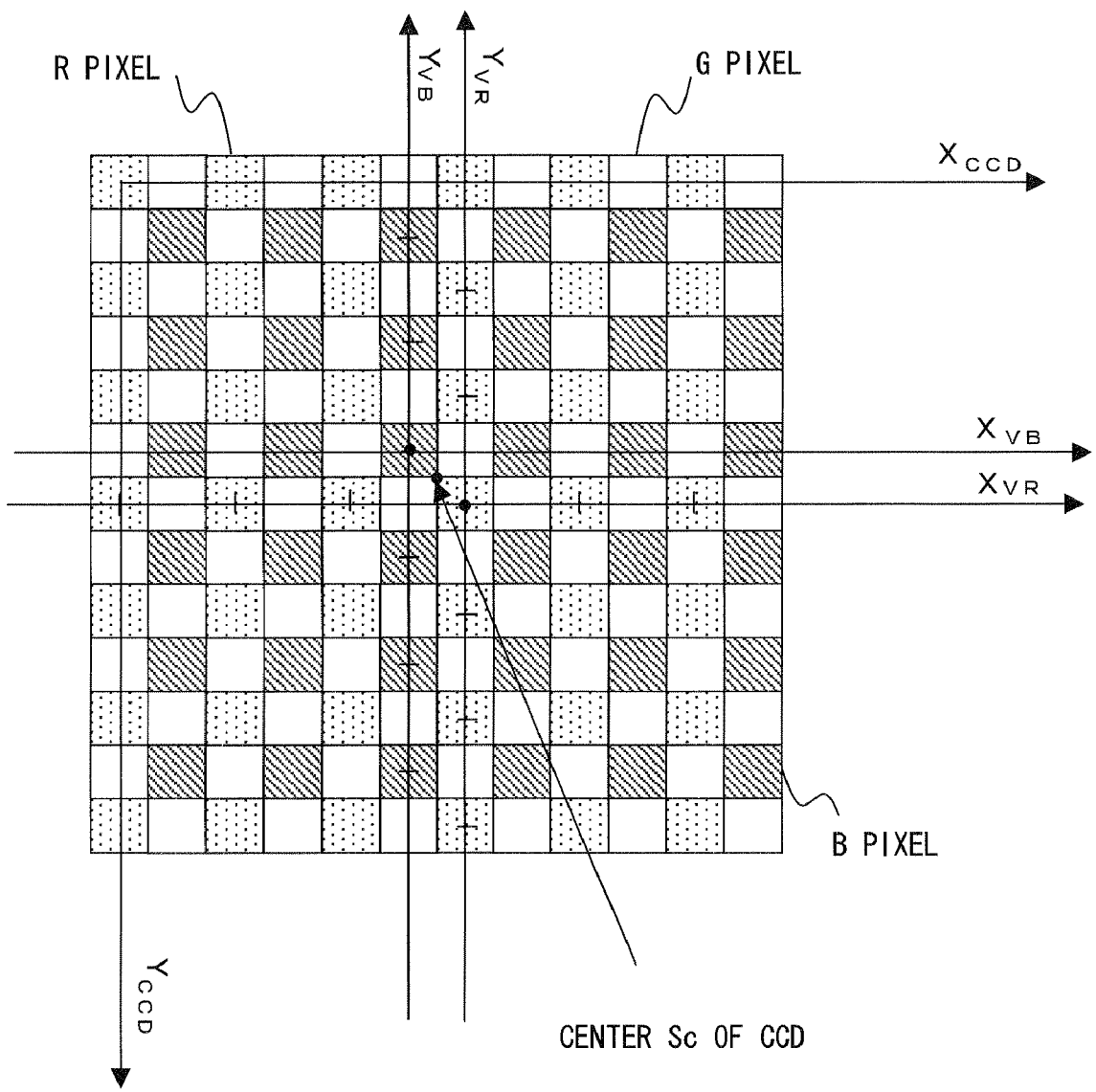
FIG. 3 is a diagram representing an example of virtual coordinate systems for R and B pixels.

The coordinate transforming part 34 calculates the coordinates representing the positions of the respective R pixel by using, as a unit, the arrangement pitch of the R pixels in the two-dimensional CCD image sensor in a virtual coordinate system for the R pixels as described below. For example, as represented in FIG. 3, with respect to the R pixels, an origin of the virtual coordinate system may be located at the center position of the R pixel nearest to the center Sc of the two-dimensional CCD image sensor, which is the imaging device 22. Also, coordinate axes $X_{VR}, Y_{VR}$ of the virtual coordinate system can be set parallel to the above coordinate axes $X_{CCD}, Y_{CCD}$.

Likewise, the coordinate transforming part 34 calculates the coordinates representing the positions of the respective B pixels by using, as a unit, the arrangement pitch of the B pixels in the two-dimensional CCD image sensor in a virtual coordinate system for the B pixels as described below. For the B pixels, as represented in FIG. 3, an origin of the virtual coordinate system may be located at the center position of the B pixel nearest to the center Sc of the two-dimensional image sensor. Also, coordinate axes $X_{VB}, Y_{VB}$ of the virtual coordinate system can be set parallel to the above coordinate axes $X_{CCD}, Y_{CCD}$ as represented in FIG. 3, for example.

Figure 4:
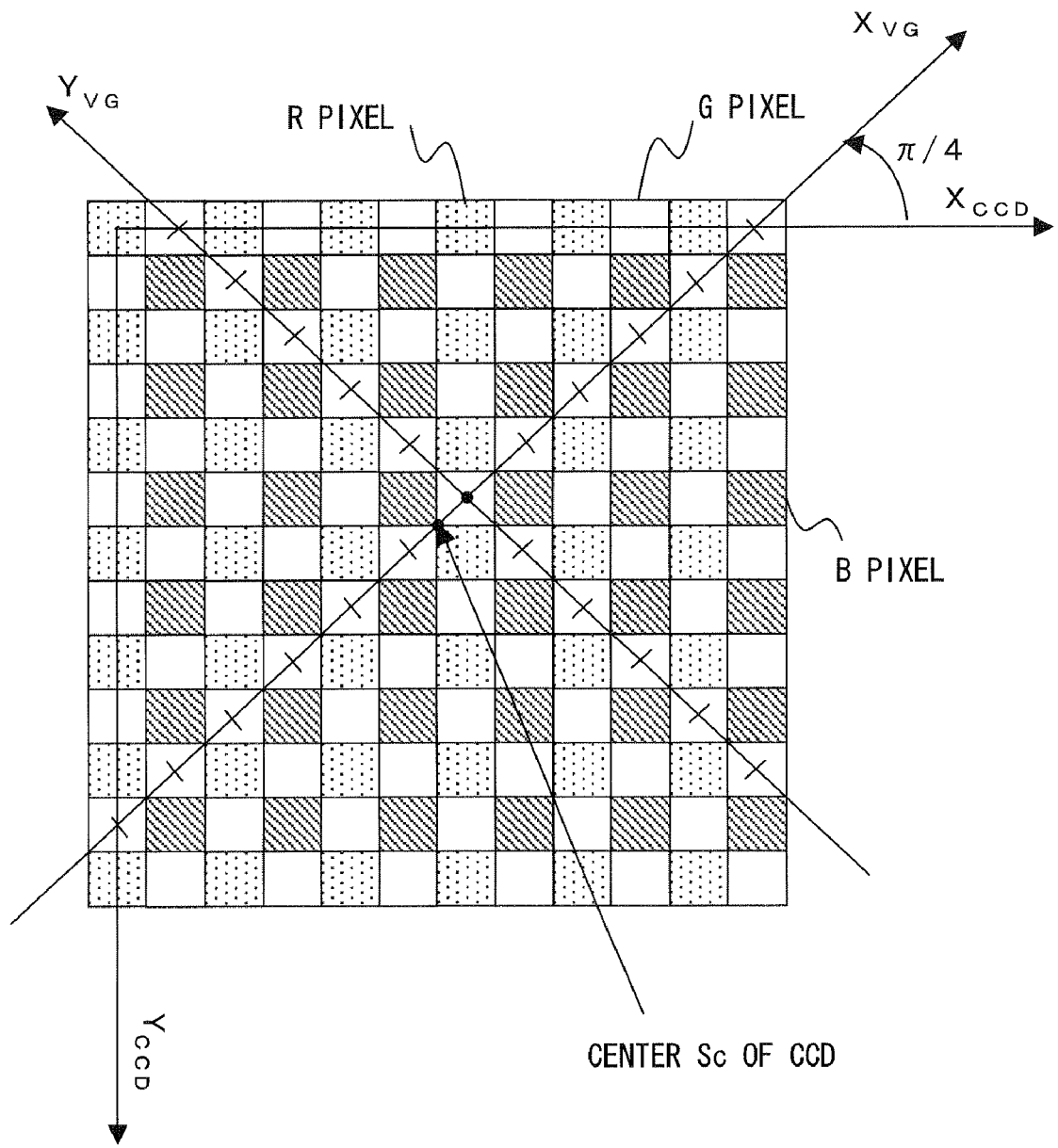
FIG. 4 is a diagram representing an example of a virtual coordinate system for G pixels.

Furthermore, the coordinate transforming part 34 calculates the coordinates representing the positions of the respective G pixels by using, as a unit, the arrangement pitch in an oblique direction of the G pixels in the two-dimensional CCD image sensor in a virtual coordinate system for the G pixels as described below. For the G pixels, as represented in FIG. 4, an origin of the virtual coordinate system may be located at the center position of any one of G pixels nearest to the center Sc of the two-dimensional image sensor. Also, coordinate axes $X_{VG}, X_{YG}$ of the virtual coordinate system can be obtained by counterclockwise rotating the above coordinate axes $X_{CCD}, Y_{CCD}$ by $\pi/4$.

With respect to the R, G, and B pixels, the coordinate values $(x_i, y_i)(i=R, G, B)$ in the virtual coordinate systems corresponding to the respective color components which are obtained by the above coordinate transformations are represented according to the following formulas (2), (3), and (4). In the formulas (2), (3), and (4), the coordinate value $(x_{CCD}, y_{CCD})$ represents the position in the coordinate system represented by the coordinate axes $X_{CCD}, Y_{CCD}$, and the coordinate value $(x_c, y_c)$ represents the center Sc of the two-dimensional image sensor in this coordinate system.

$$\begin{pmatrix} x_R \\ y_R \end{pmatrix} = \frac{1}{4}\begin{pmatrix} 2(x_{CCD} - x_c) - 1 \\ -2(y_{CCD} - y_c) + 1 \end{pmatrix} \quad (2)$$

$$\begin{pmatrix} x_G \\ y_G \end{pmatrix} = \frac{1}{2}\left\{\begin{pmatrix} 1 & -1 \\ -1 & -1 \end{pmatrix}\begin{pmatrix} x_{CCD} - x_c \\ y_{CCD} - y_c \end{pmatrix} - \begin{pmatrix} 1 \\ 0 \end{pmatrix}\right\} \quad (3)$$

$$\begin{pmatrix} x_B \\ y_B \end{pmatrix} = \frac{1}{4}\begin{pmatrix} 2(x_{CCD} - x_c) + 1 \\ -2(y_{CCD} - y_c) - 1 \end{pmatrix} \quad (4)$$

The calculation processing for the coordinate transformations represented by these formulas (2), (3), and (4) can be implemented by addition, subtraction and bit shift operation, and thus it can be performed at an extremely high speed.

Furthermore, by substituting the formula (1) into these formulas (2), (3), and (4), the formulas (5), (6), and (7) are obtained. The formulas (5), (6), and (7) represent the coordinate transformation results corresponding to the coordinates in the image after the correcting processing, in which coordinates are determined for each R pixel, each G pixel, and each B pixel by the position calculating part 35.

$$x_R = \frac{1}{4}\left\{\frac{100+D(r)}{100+D_a}(2x-2x_c)-1\right\} \quad (5)$$

$$y_R = \frac{1}{4}\left\{\frac{100+D(r)}{100+D_a}(-2y+2y_c)+1\right\}$$

$$x_G = \frac{1}{4}\left\{\frac{100+D(r)}{100+D_a}(2x-2x_c-2y+2y_c)-2\right\} \quad (6)$$

$$y_G = \frac{1}{4}\frac{100+D(r)}{100+D_a}(-2x+2x_c-2y+2y_c)$$

$$x_B = \frac{1}{4}\left\{\frac{100+D(r)}{100+D_a}(2x+2x_c)+1\right\} \quad (7)$$

$$y_B = \frac{1}{4}\left\{\frac{100+D(r)}{100+D_a}(-2y+2y_c)-1\right\}$$

The shift processing part 37 executes proper bit shift processing on the coordinate values $(x_i, y_i)$ (i=R, G, B) obtained according to these formulas (5), (6), and (7). Accordingly, when pixel data at the position represented by the coordinate value $(x_i, y_i)$ in the virtual coordinate system for each color component is determined by the interpolation processing, information for specifying a combination of neighboring pixels to provide pixel data to be considered and information representing a weighting to be applied with respect to the pixel data corresponding to these pixels are obtained.

Figure 5:
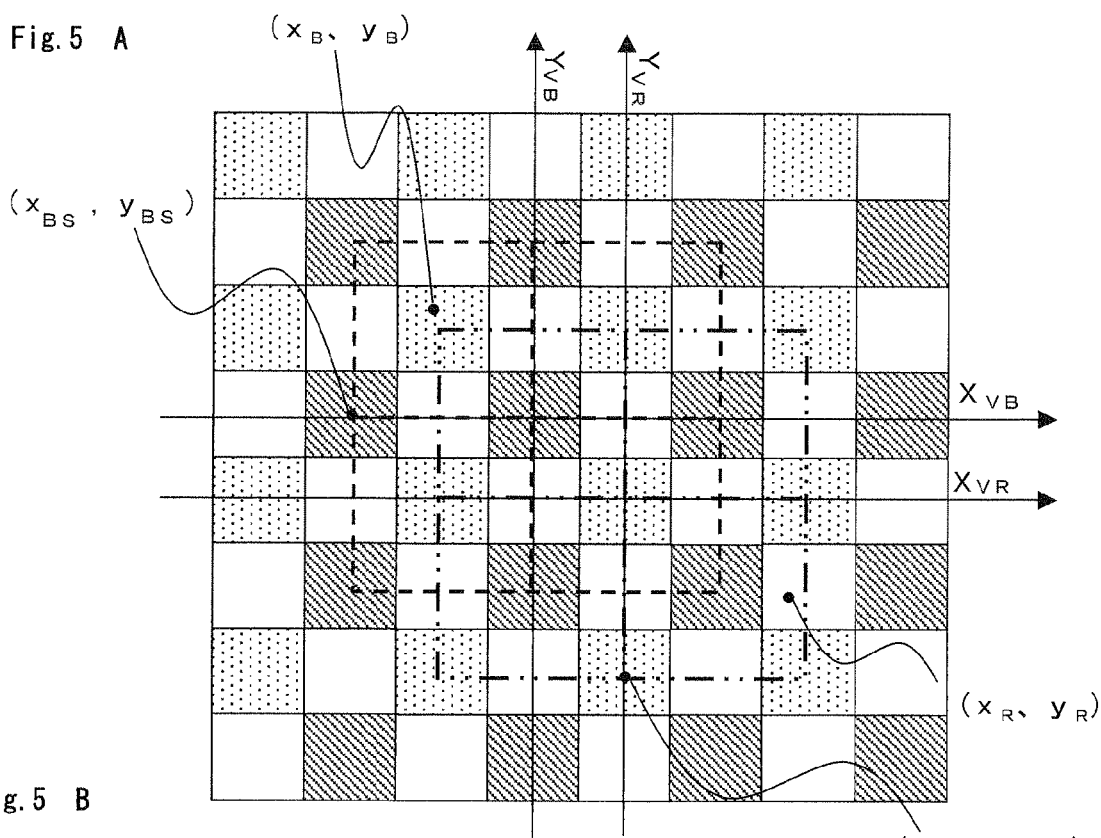
FIGS. 5A and B are a diagram representing neighboring pixels.
Figure 5:
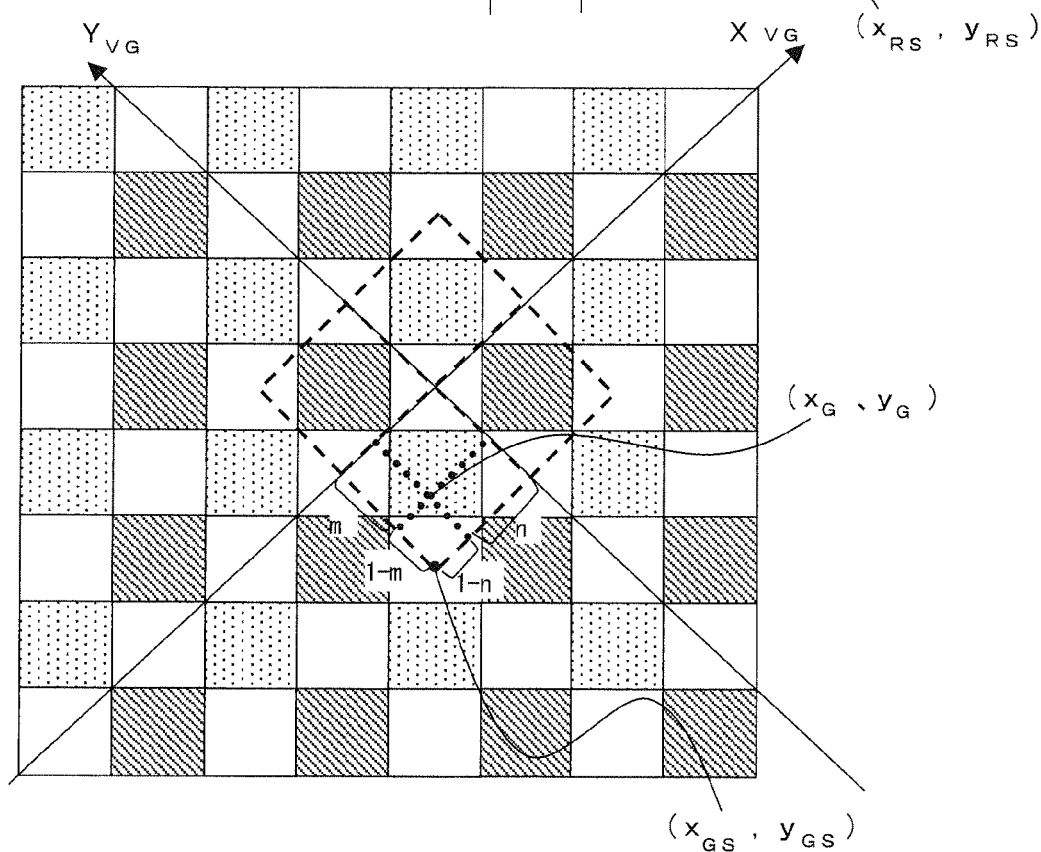

For example, the shift processing part 37 executes the proper bit shift processing on the coordinate value $(x_R, y_R)$ obtained by the transformation to the virtual coordinate system represented by the coordinate axes $X_{VR}, Y_{VR}$ in the coordinate transforming part 34, thereby obtaining the following two kinds of information. One kind of information is the coordinate $(x_{RS}, y_{RS})$ representing a reference for specifying the minimum grid formed by R pixels surrounding the coordinate value $(x_R, y_R)$ as indicated by a heavy two-dotted chain line in FIG. 5A (in this case, the reference located at the left lower side of the grid). The other kind of information is the distance ratio from the center coordinates of each of the R pixels forming the grid to the coordinate value $(x_R, y_R)$.

Likewise, the shift processing part 37 executes proper bit shift processing on the coordinate value $(x_B, y_B)$ obtained by the transformation to the virtual coordinate system represented by the coordinate axes $X_{VB}, Y_{VB}$ in the coordinate transforming part 34, thereby obtaining the following two kinds of information. One kind of information resides in the coordinate $(x_{BS}, y_{BS})$ representing a reference for specifying the minimum grid formed by B pixels surrounding the coordinate value $(x_B, y_B)$ as indicated by a heavy dashed line in FIG. 5A (in this case, the reference located at the left lower side of the grid). The other kind of information resides in the distance ratio from the center coordinate of each of the B pixels forming the grid to the coordinate value $(x_B, y_B)$.

Likewise, the shift processing part 37 executes proper bit shift processing on the coordinate value $(x_G, y_G)$ obtained by the transformation to the virtual coordinate system represented by the coordinate axes $X_{VG}, Y_{VG}$ in the coordinate transforming part 34, thereby obtaining the following two kinds of information. One kind of information resides in the coordinate $(x_{GS}, y_{GS})$ representing a reference for specifying the minimum grid formed by G pixels surrounding the coordinate value $(x_G, y_G)$ as indicated by a heavy dashed line in FIG. 5B (in this case, the reference located at the left lower side of the grid). The other kind of information resides in the distance ratio from the center coordinate of each of the G pixels forming the grid to the coordinate value $(x_G, y_G)$.

At an inverse transforming part 36 represented in FIG. 1, the coordinate values $(x_{CCDiS}, y_{CCDiS})$ (i=R, G, B) in the coordinate system represented by the coordinate axes $X_{CCD}, Y_{CCD}$ represented in FIG. 2 or 3 can be obtained after substituting the coordinates $(x_{iS}, y_{iS})$ (i=R, G, B) representing the thus-obtained references for inverse transforming equations represented by the following formulas (8), (9), and (10).

$$x_{CCDRS} = \frac{1}{2}(4x_{RS} + 2x_c + 1) \quad (8)$$

$$y_{CCDRS} = \frac{1}{2}(-4y_{RS} + 2y_c + 1)$$

$$x_{CCDGS} = \frac{1}{2}(2(x_{GS} - y_{GS}) + 2x_c + 1) \quad (9)$$

$$y_{CCDGS} = \frac{1}{2}(-2(x_{GS} + y_{GS}) + 2y_c - 1)$$

$$x_{CCDBS} = \frac{1}{2}(4x_{BS} + 2x_c - 1) \quad (10)$$

$$y_{CCDBS} = \frac{1}{2}(-4y_{BS} + 2y_c - 1)$$

The coordinate value obtained by the inverse transforming part 36 as described above corresponds to the address in the two-dimensional CCD image sensor of the pixel at the reference position of the grid formed by the pixels for the color component being noted.

Accordingly, based on this coordinate value, a pixel data calculating part 38 represented in FIG. 1 first determines addresses on the two-dimensional CCD image sensor of four pixels corresponding to the apexes of a grid surrounding a position at which pixel data should be determined. Subsequently, by performing the interpolation processing, in which the distance ratio received from the shift processing part 37 had been applied, with the pixel data read out from the memory 24 according to these addresses at the pixel data calculating part 38, whereby the pixel data which the distortion correction is applied for noted component can be obtained.

As described above, according to the embodiment of the present application represented in FIG. 1, by applying the coordinate transformation using the features of the pixel arrangements of the respective color components in the Bayer image, the calculation processing, which used to be calculate by performing complicated case classification, can be implemented only by using addition, subtraction, and the bit shift processing. Accordingly, the processing of specifying the four pixels corresponding to the apexes of the grid surrounding the pixel and the processing of specifying the contribution degree of the pixel data of these pixels for the purpose of the distortion correction can be dramatically enhanced in processing speed.

Particularly, in the distortion correcting process concerning the G pixels, in order to actively use the high arrangement density of the G pixels in the Bayer array, the case classification is particularly complicated for the position calculation in the coordinate system corresponding to the address of the two-dimensional CCD image sensor in conventional art. The processing speed of the processing performed with this complicated procedure can be increased by applying the combination processing of the coordinate transformations and the bit shift processing according to this application, and thus an obtained advantage is very big.

Furthermore, the calculation amount can be further reduced by using the fact that distortion appears in optical axis symmetry.

For example, at the case for the G pixels, when each coordinate value $(x_G, y_G)$ in the coordinate system represented by the coordinate axes $X_{VG}$, $Y_{VG}$ is obtained within a range in which the coordinate value y is equal to or more than a numerical value "0" (an upper half area of CCD), the coordinate value ($x_{Gt}$, $y_{Gt}$) corresponding to a G pixel which is located within a lower side area of CCD and is centrosymmetric with respect to the G pixel being noted can be represented by using the determined coordinate value ($x_G$, $y_G$) according to the following formula (11).

$$\begin{pmatrix} x_{Gt} \\ y_{Gt} \end{pmatrix} = \begin{pmatrix} -x_G - 1 \\ -y_G \end{pmatrix} \qquad (11)$$

As described above, the distortion correcting process concerning the pixel data of each color component constituting a Bayer image can be executed at the stage of the Bayer image. The Bayer image after the distortion correction is subjected to the deBayer processing by the interpolating part 32, thereby obtaining distortion-corrected image data.

Furthermore, in addition to the above distortion, chromatic aberration of magnification can be corrected for the R pixels and the B pixels constituting the Bayer image. Accordingly, false color in the neighborhood of an edge can be removed, and thus the image quality can be further enhanced.

Embodiment 2

Figure 6:
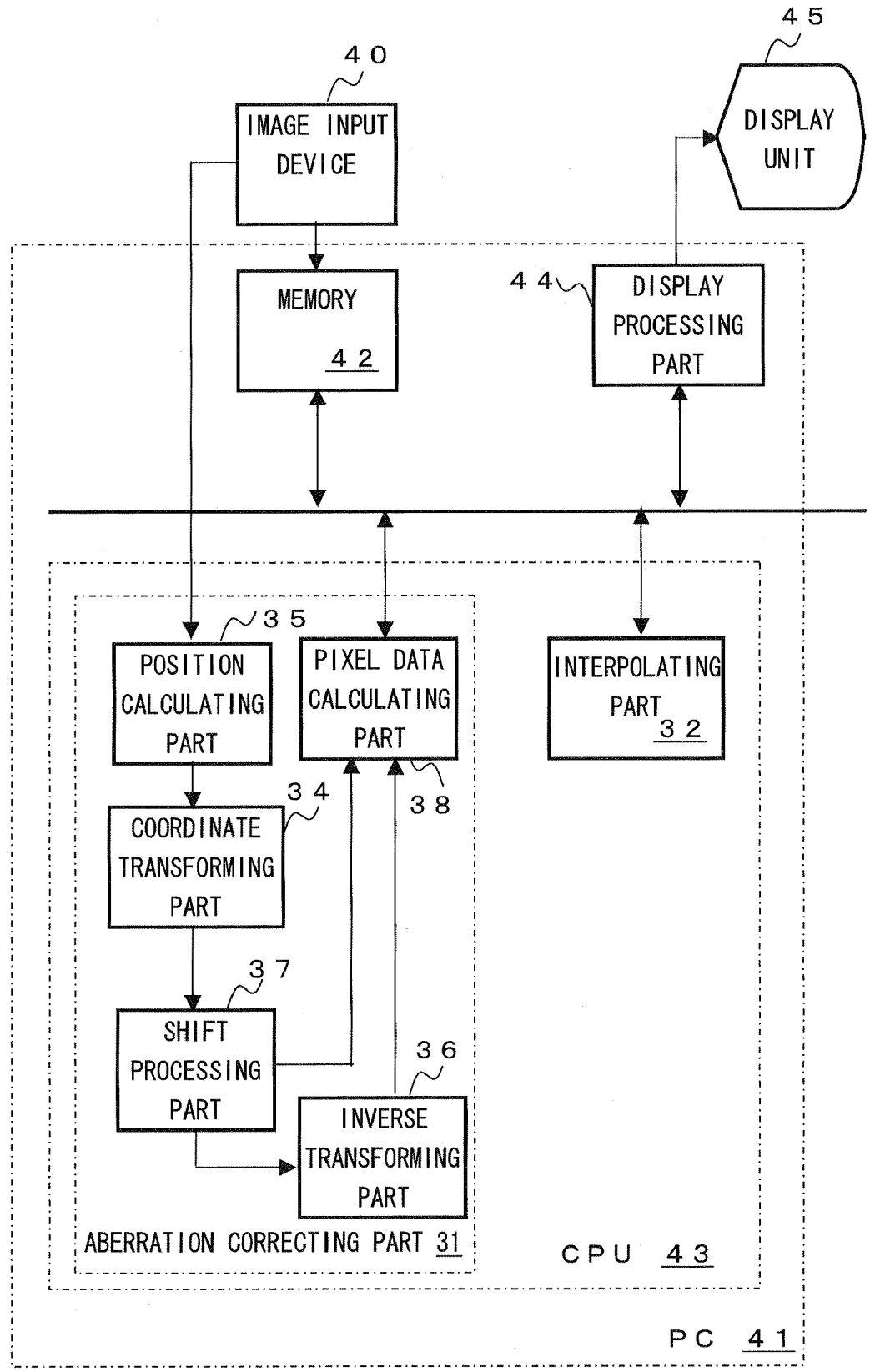
FIG. 6 is a diagram representing another embodiment of an image processing device.

FIG. 6 represents another embodiment of the image processing device according to the present application.

With respect to the constituent elements represented in FIG. 6, the same parts as represented in FIG. 1 are represented by the same reference numerals as represented in FIG. 1, and the description thereof is omitted.

In FIG. 6, the image processing device according to this application is implemented by software which implements the functions of the aberration correcting part 31 and the interpolating part 32 in CPU 43 equipped in a personal computer (PC) 41.

An image input device 40 represented in FIG. 6 is a digital camera or color scanner which has, for example, a two-dimensional CCD image sensor having color filters arranged according to the Bayer array and has a function of outputting an obtained Bayer image. The Bayer image delivered from this image input device 40 is stored in a memory 42 of the personal computer 41.

The aberration correcting part 31 represented in FIG. 6 executes the aberration correction processing based on the information concerning distortion and chromatic aberration of magnification delivered from the image input device 40 as described with respect to the Embodiment 1 described above. At this time, the Bayer image stored in the memory 42 is rewritten by using the pixel data of each color component constituting the Bayer image calculated by the pixel data calculating part 38, thereby obtaining a Bayer image for which the distortion and the chromatic aberration of magnification are corrected.

The distortion-corrected Bayer image is read out from the memory 42 by the interpolating part 32 represented in FIG. 6. The Bayer image is subjected to the deBayer processing by the interpolating part 32, whereby image data containing a lineup of R, G, B components are obtained for all the pixels of the two-dimensional CCD image sensor provided to the image input device 40.

The image data obtained as described above are used for display processing of a display processing part 44 and a display unit 45 and also used for various image processing.

As described above, the image processing device according to this application can implement high-precision aberration correction by combining the Bayer-image outputting function equipped to a digital camera or the like and the high processing capability of a personal computer, for example by using detailed information on the distortion.

By installing the image processing device of this application into an image input device such as a digital camera, a color scanner or the like, the processing speed of the image processing containing aberration correction can be increased as the stage of processing the Bayer image. Furthermore, the image processing device is executed by a personal computer or the like as a part of image processing software, whereby high-speed aberration correcting processing can be implemented.

Accordingly, this application is remarkably effective in the image input device field and also in an image processing device field in which various processing is executed on image data obtained by an image inputting device.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An image processing device executing processing concerning a pixel value of each pixel corresponding to one of a plurality of wavelength components including a first, a second, and a third wavelength components contained in image data obtained by a two-dimensional image sensor in which each of filters corresponding to one of the plurality of wavelength components including at least the first, the second, and the third wavelength components is disposed in connection with each pixel according to a rule concerning an arrangement of the filters corresponding to each of the wavelength components, the image processing device comprising:

a coordinate transforming unit transforming a basic coordinate system having coordinate axes corresponding to arrangement directions of the pixel in the two-dimensional image sensor to a virtual coordinate system corresponding to an arrangement rule of the filters of each of the wavelength components;

a position calculating unit executing position calculation processing for image processing containing an aberration correction in the virtual coordinate system corresponding to each of the wavelength components to determine coordinates in the virtual coordinate system; and an inverse transforming unit transforming the coordinates in the virtual coordinate system obtained by the position calculating unit to coordinates in the basic coordinate system.

2. The image processing device according to claim 1, wherein a Bayer image obtained by the two-dimensional image sensor in which square pixels are arranged in a two-dimensional arrangement and filters corresponding to the first wavelength component are arranged continuously in an oblique direction is a processing target image, and the coordinate transforming unit has a first transforming unit which performs a transformation from the basic coordinate system to a virtual coordinate system having coordinate axes corresponding to arrangement directions of the filters corresponding to the first wavelength component.

3. The image processing device according to claim 2, wherein
the first transforming unit comprises:
a coordinate rotating unit performing a rotation of a coordinate system around a predetermined pixel position on the two-dimensional image sensor as a center of the rotation;
a first translating unit translating a position of origin of the virtual coordinate system corresponding to the first wavelength component while a size of pixel forming the two-dimensional image sensor is set as a unit; and
a first scale converting unit performing a scale conversion for setting a length different from the size of pixel forming the two-dimensional image sensor as a unit in the virtual coordinate system corresponding to the first wavelength component.

4. The image processing device according to claim 2, wherein
the coordinate transforming unit comprises:
a second translating unit translating each position of origin of the virtual coordinate system corresponding to the second wavelength component and the third wavelength component while a size of pixel forming the two-dimensional image sensor is set as a unit; and
a second scale converting unit performing a scale conversion for setting a length different from the size of pixel forming the two-dimensional image sensor as a unit in the virtual coordinate system corresponding to each of the second wavelength component and the third wavelength component.

5. The image processing device according to claim 3, further comprising:
a translation amount determining unit independently determining the position of origin of the virtual coordinate system corresponding to each of the wavelength components, the position of origin being translated by the first translating unit; and
a unit determining unit independently determining a unit of a scale concerning the virtual coordinate system corresponding to each of the wavelength components, the scale being converted by the first scale converting unit.

6. The image processing device according to claim 4, further comprising:
a translation amount determining unit independently determining the position of origin of the virtual coordinate system corresponding to each of the wavelength components, the position of origin being translated by the second translating unit; and
a unit determining unit independently determining a unit of a scale concerning the virtual coordinate system corresponding to each of the wavelength components, the scale being converted by the second scale converting unit.

7. An image processing method executing processing concerning a pixel value of each pixel corresponding to one of a plurality of wavelength components including a first, a second, and a third wavelength components contained in image data obtained by a two-dimensional image sensor in which each of filters corresponding to one of the plurality of wavelength components including at least the first, the second, and the third wavelength components is disposed in connection with each pixel according to a rule concerning an arrangement of the filters corresponding to each of the wavelength components, the image processing method comprising:
a coordinate transforming step transforming a basic coordinate system having coordinate axes corresponding to arrangement directions of the pixel in the two-dimensional image sensor to a virtual coordinate system corresponding to an arrangement rule of the filters of each of the wavelength components;
a position calculating step executing position calculation processing for image processing containing an aberration correction in the virtual coordinate system corresponding to each of the wavelength components to determine coordinates in the virtual coordinate system; and
an inverse transforming step transforming the coordinates in the virtual coordinate system obtained in the position calculating step to coordinates in the basic coordinate system.

* * * * *